May 2, 1939.  F. L. FULKE  2,156,725
METHOD OF MAKING CUTTER BITS
Filed May 23, 1935  2 Sheets—Sheet 1
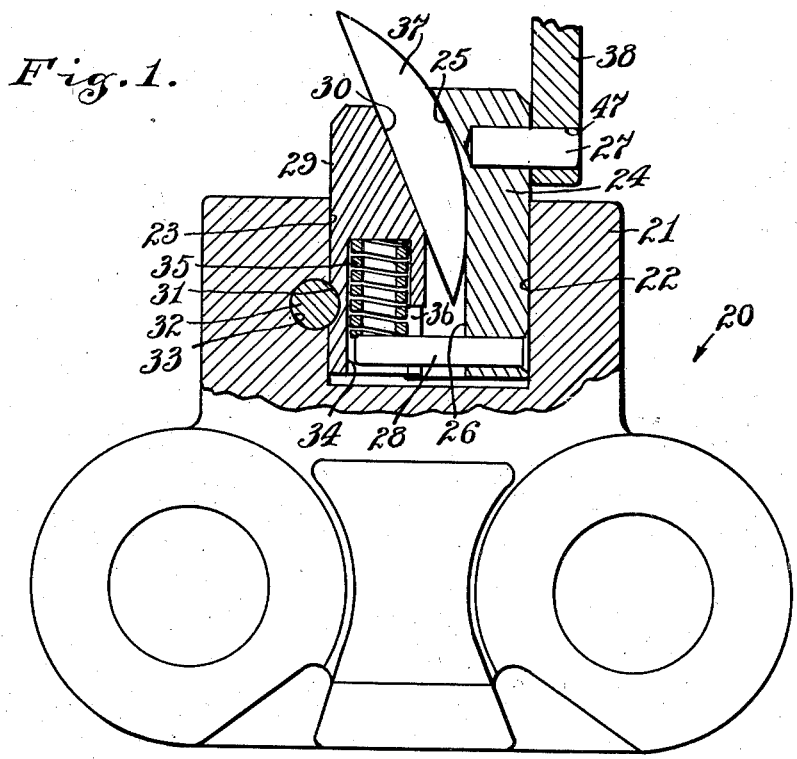
INVENTOR
Frank L. Fulke,
BY
Hood + Hahn
ATTORNEYS May 2, 1939.  F. L. FULKE  2,156,725
METHOD OF MAKING CUTTER BITS
Filed May 23, 1935  2 Sheets-Sheet 2
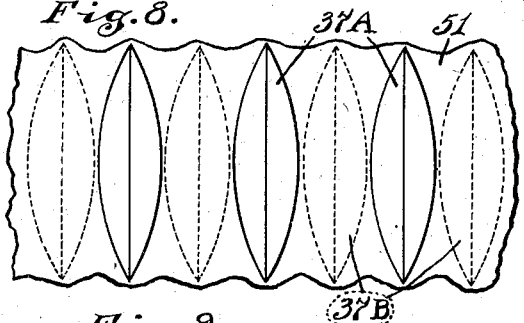
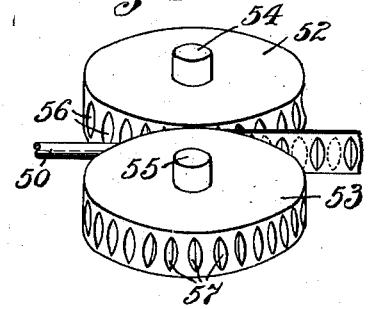
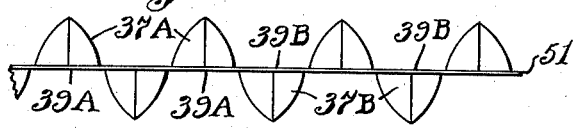
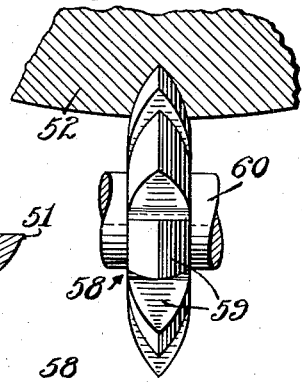
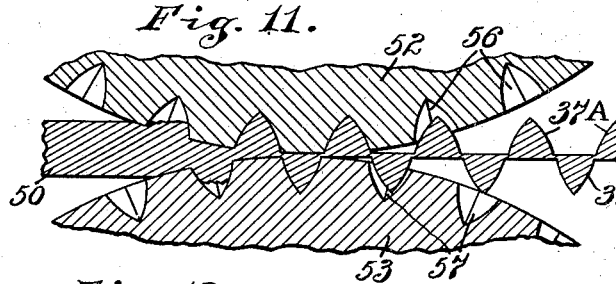
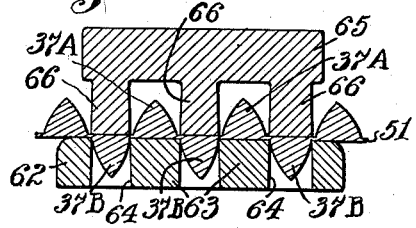
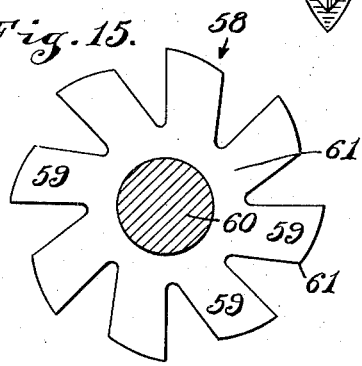
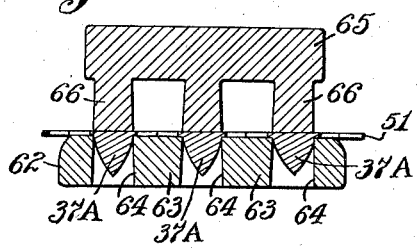
INVENTOR
Frank L. Fulke,
BY Hood & Hahn
ATTORNEYS Patented May 2, 1939

2,156,725

UNITED STATES PATENT OFFICE 2,156,725

METHOD OF MAKING CUTTER BITS

Frank L. Fulke, Terre Haute, Ind., assignor to Frank Prox Company, Terre Haute, Ind., a corporation of Indiana Application May 23, 1935, Serial No. 23,017

4 Claims. (Cl. 76—108)

The present application relates to the method of making cutter bits for mining machine chains.

Broadly stated, the primary object of the invention is to improve upon mining machine chains, the elements thereof, and methods of and means for making such elements. A primary purpose underlying the invention disclosed herein is to provide a bit for mining machine cutter chains which shall be extremely inexpensive, as compared to previously known bits; and the provision of such a bit involves a new method of making the same, and requires the provision of novel clamping means for holding such bits in place on a cutter chain. In the production of such clamping means, it has been necessary for me to evolve a novel method of producing such clamping means; such method being closely tied up with the methods of, and means for, producing the novel bits.

Further and more particular objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, or in the specific steps stated, so long as the scope of the appended claims is not violated.

Fig. 1 is a more or less diagrammatic view of a cutter chain link with which is associated a bit constructed in accordance with the present invention, held in place therein by clamping means constructed in accordance with the present invention, said clamping means and part of said link being shown in section;

Fig. 2 is a horizontal sectional view, taken at right angles to the plane of Fig. 1, and looking upwardly;

Fig. 3 is a side elevation of the novel bit;

Fig. 4 is a rear elevation thereof;

Fig. 5 is a top plan thereof;

Fig. 6 is a front elevation of one element of the clamping means of the present application;

Fig. 7 is a more or less diagrammatic view illustrating a step in the manufacture of the element shown in Fig. 6;

Fig. 8 is a fragmental plan view of a piece of metal which has been passed through the initial forming step of the bit-forming method of the present application;

Fig. 9 is a side elevation thereof;

Fig. 10 is a diagrammatic isometric view illustrating the process step which produces the piece shown in Figs. 8 and 9;

Fig. 11 is an enlarged fragmental section taken on a plane perpendicular to the axes of the discs of Fig. 10;

Fig. 12 is a more or less diagrammatic sectional view, showing the initial punching step in the bit-forming process;

Fig. 13 is a view similar to Fig. 12, but showing the final punching step;

Fig. 14 is a diagrammatic view illustrating the formation of die cavities; and

Fig. 15 is an elevation of a cutter used in the practice of the process of the present application.

Referring, now, to Figs. 1 and 2, it will be seen that I have illustrated a mining machine chain link of generally conventional form, said link being indicated generally by the reference numeral 20. Said link comprises, as usual, an upstanding head 21, in which are formed two part-cylindrical sockets 22 and 23; said sockets being formed upon parallel axes, and the distance between said axes being less than the sum of the radii of said sockets; whereby said sockets overlap. In the socket 22 is received a jaw member 24 formed, in one face, with a groove comprising a portion 25, the shape of which is a segment of a double-convex disc; and a portion 26, opening into the lower end of the portion 25. The walls of the portion 26 are likewise concaved, but the line of juncture of said walls is straight, whereas the line of juncture of the walls of the portion 25 is the arc of a circle.

Adjacent its upper end, the element 24 is provided with a rearwardly projecting pin 27; and adjacent its lower end, said element 24 is provided with a forwardly projecting pin 28. Within the socket 23 is received a wedge member 29 having a flat wedge surface 30 adjacent its upper end, and presented substantially opposite the portion 25 of the groove formed in the element 24. Said element 29 is formed in its forward face with a transverse groove 31 which receives a part of a pin 32 projecting transversely through the head 21, the major portion of said pin being received in a transverse groove 33 formed in said head. It will be seen that the pin 32 holds the element 29 rigidly in place in its socket 23.

Within said element 29, and opening through the lower end thereof, is formed a pocket 34 receiving a coiled spring 35 the lower end of which, when the organization is assembled in the manner illustrated in Fig. 1, bears upon the pin 28 to urge the element 24 downwardly in its socket 22. The element 29 is formed with a slot 36 through which the pin 28 projects into abutting relation with the lower end of the spring 35.

A bit 37, which will be described in detail hereinafter, is received in the portion 25 of the groove in the jaw member 24, and is held in place therein by engagement with the cam surface 30; the force of the spring 35 being exerted to establish a wedge-locked relationship of said bit 37 between said groove portion 25 and said cam surface 30.

A tool 38 is formed with an aperture 47 to receive the pin 27, said tool being rotatable about the axis of said pin to bear on the upper surface of the head 21 to lift the jaw member 24 against the tendency of the spring 35, whereby the bit 37 will be released.

In Figs. 3 and 4 the bit 37 is illustrated in detail. Said bit comprises a flat front wall 39, the contour of which is a sharp-ended ellipse; and two identical convex walls 40 and 41, the contours of which are segments of convex circular figures. The walls 40 and 41 meet in a relatively sharp curved edge 42; the walls 39 and 40 meet in a cutting curved edge 43; and the walls 39 and 41 meet in a cutting curved edge 44, identical with the edge 43. The edges 43 and 44 meet, in the plane of the edge 42, in a sharp cutting point 45, at one end, and in a sharp cutting point 46 at the other end.

Briefly stated, the completed bit has the shape of a minor segment of a double-convex disc.

It will be readily seen that this bit element, normally not over two and a half inches in length and approximately nine-sixteenths of an inch in major width, provides an extremely inexpensive mining machine bit, double-pointed, readily replaceable, and containing so little material that it will be less expensive to replace it than to resharpen it. It will also be seen that, in the present application, I have illustrated one extremely efficient, unusually readily operable, holding means for such a bit; the advantages of which, when used in connection with the illustrated bit, will be readily apparent to anyone familiar with the cumbersome bit holding means heretofore in use in the practical art.

In Figs. 8 to 15, I have illustrated one preferred method of producing such bits. Briefly, that method comprises the provision of at least two dies, each formed, in substantially flat faces, with a plurality of die cavities, each die cavity having the shape of a segment of a double-convex disc; bringing those two dies into cooperative relation with each other, with the cavities of the respective dies out of registry with each other; introducing between said dies a piece of metal; applying force to the metal piece to cause portions of the material thereof to flow into, and fill, all of such die cavities, whereby an element such as illustrated in Figs. 8 and 9 is produced; and punching the projections so produced out of the metal piece, preferably by the application of force to the flat surfaces of said projections.

In Figs. 8 and 9 there is illustrated a piece, or a portion of a piece, which is the result of forcing portions of the metal to flow into the cavities of the die elements. I have designated the projections formed by such flowing into the cavities of one die by the reference numeral 37A; and the projections resulting from the flow of metal into the cavities of the other die by the reference numeral 37B. It will be seen that the projections 37A are spaced apart a distance substantially equal to their major dimension in the direction of such spacing; and that the projections 37B are similarly spaced apart; so that the projections 37A and 37B are alternately arranged on the piece with substantially no waste of material between them. That is, the widths of the flat surfaces 39A and 39B are substantially equal to the major lateral dimensions of the projections 37A and 37B.

In Fig. 10 is illustrated one mechanism which may be used in the formation of the units illustrated in Figs. 8 and 9. A metal piece, which in Fig. 10 is illustrated as a round bar 50, is passed between two rolls 52 and 53. Each of said rolls is a cylindrical disc, and said rolls are mounted upon parallel axes 54 and 55 for rotation thereabout. The peripheral surface of the disc 52 is formed with a series of cavities 56, each having the shape of a segment of a double-convex disc; and the peripheral surface of the disc 53 is similarly formed with a series of cavities 57, each likewise having the shape of a segment of a double-convex disc. Means (not shown) is provided for synchronizing the rotation of said discs in such a manner that no cavity 57 ever registers with any cavity 56. This arrangement, of course, provides for the alternate or staggered relation of the projections 37A and 37B on the finished piece.

Preferably, the rolls 52 and 53 are directly power driven, and the piece 50 is simply fed therebetween, being pulled through by the action of the rolls themselves. Since the initial thickness of the piece 50 is materially greater than the distance between adjacent points on the peripheral surfaces of the rolls 52 and 53, the heated metal of the piece 50 is caused to flow, as it is fed between said rolls, to occupy and fill the cavities 56 and 57. It is to be understood that the relation between the initial dimensions of the piece 50 and the spacing between the rolls is so precalculated as to cause the flowing metal to fill completely all of the cavities 56 and 57 without the formation of an excessive flash 51.

From an inspection of Fig. 11, it will be seen that the surfaces of the rolls between the cavities 56 and between the cavities 57 operate upon the metal piece 50 in such a manner as to form the flat surfaces 39A and 39B. In this respect, those portions of the rolls act as would flat surfaces; and hence, they may be considered as substantially flat surfaces, in spite of their curvature.

After the piece 50 has been passed between the rolls, and has thereby been caused to assume the appearance of the piece illustrated in Figs. 8 and 9, it is brought into association with a punching die set comprising a base 62 having bars 36 defining ports 64 into which the projections 37B, for instance, may be snugly inserted. A male punching die 65, having fingers 66 arranged to register with the ports 64, is then forced toward said die 62, the ends of the fingers 66 contacting the surfaces 39B, whereby the projections 37B are punched out of the flashing 51. This step is illustrated in Fig. 12.

Thereupon, the piece is inverted, the projections 37A being inserted in the ports 64, and the die 65 is again operated to punch the projections 37A out of the flashing.

The above-described operations complete the production of operative cutter bits, although, in some instances, it may be desirable to grind at least some of the bits to perfect the surfaces thereof. In some instances, it may be necessary to grind off the flange surrounding the face 39, which results from the punching operation.

The indicated shape of my cutter bit lends itself very nicely to production in accordance with the above-described method, even to the extent of facilitating the production of the forming dies. Since the desired final shape of the cutter bit is a segment of a double-convex disc, the die cavities may be cut readily with a rotating tool. In Figs. 14 and 15 I have illustrated such a tool, the same being indicated generally by the reference numeral 58. Such tool comprises a radial series of teeth 59, each of which is formed in cross section as a Gothic arc. Said cutter is mounted upon a rotating shaft 60; and each tooth is preferably relieved at its following end, as at 61. It will be obvious that, as the cutter 58 is rotated it may be advanced radially into any surface, and will produce therein a cavity having the shape of a segment of a double-convex disc; the extent of the cord defining one surface of the segment being dependent upon the degree of entry of the tool into the element being cut.

It will also be obvious that, if the die becomes worn or defaced, it may be readily repaired simply by facing off a shallow portion of its surface and thereafter deepening the cavities by the operation of the same cutter 58.

An important feature of the present invention lies in the use of the same, or an identical, cutter in producing the portion 25 of the groove in the element 24, as is used in producing the cavities 56 and 57 of the forming dies. In Fig. 7 is illustrated the cutter 58 in the act of producing the portion 25 of the socket of an element 24. Since that socket is formed with the same tool which is used in forming the die cavities, and since the die cavities are completely filled in the production of the bits, there must be an absolute fit between the sockets of the elements 24 and the bits.

The extreme importance of my described method of insuring absolute fit between the associated elements involved will be clearly understood when it is realized that to securely wedgelock my bit I am depending upon the working forces applied to my bit to aid and assist the relatively slight tension provided by my spring in order to securely and solidly wedgelock the involved members against any possibility of displacement. This objective could not be attained without insuring absolute cooperatively fitted relationship between the bit and the jaw, and providing, as I do with my cutting tool 58, for maintaining at all times, from one year to the next, a synchronizing method of insuring the cooperative uniformity of the die recesses into which I form the bits and the jaw recesses into which I seat the bits.

I claim as my invention:

1. The method of making cutter bits which comprises the steps of hot forging a piece of metal to form a series of identical projections from one face of said piece, said projections being spaced from each other, and to form a series of identical projections from the opposite face of said piece, the units of said second series being respectively positioned between the units of said first series, punching the units of one of said series out of said piece, and thereafter punching the units of the other of said series out of said piece.

2. The method of forming cutter bits which comprises the steps of forging a piece of metal between a pair of dies, each of said dies being formed with a series of cavities and the cavities of one die being staggered with respect to the cavities of the other die, whereby said piece is formed with a series of identical projections from one face and a series of identical projections from its opposite face staggered with respect to the units of said first series, the opposite faces of said piece intermediate said projections being flat, punching the units of one of said series out of said piece by pressure applied to the flat faces thereof, and subsequently punching the units of the other of said series out of said piece by pressure applied to the flat faces thereof.

3. The method of producing double-pointed forged cutter bits which comprises the steps of impressing the form of the bits alternately on opposite sides of a metallic strip, thereafter punching out of the strip the bits formed on one side of said strip, and subsequently punching out of the strip the bits formed on the other side of said strip.

4. The method of forming cutter bits which comprises the steps of passing a piece of metal between a pair of rolls, each of said rolls being formed with a series of cavities, and said rolls being so synchronized that each cavity of one roll is always out of registry with every cavity of the other roll, whereby said piece is formed with a series of identical projections from one face and a series of identical projections from its opposite face staggered with respect to the units of said first series, the opposite faces of said piece intermediate said projections being flat, punching the units of one said series out of said piece by pressure applied to the flat faces thereof, and subsequently punching the units of the other of said series out of said piece by pressure applied to the flat faces thereof.

FRANK L. FULKE.